(12) United States Patent
Lemoine et al.

(10) Patent No.: US 10,944,221 B2
(45) Date of Patent: Mar. 9, 2021

(54) SYSTEMS AND DEVICES FOR AUTHENTICATION

(71) Applicant: ASSA ABLOY AB, Stockholm (SE)

(72) Inventors: Joseph Lemoine, Suresnes (FR); Ahmed Amara, Paris (FR); Florent Vibert, Tournan-en-brie (FR)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 16/560,454

(22) Filed: Sep. 4, 2019

(65) Prior Publication Data

US 2020/0076138 A1    Mar. 5, 2020

Related U.S. Application Data

(60) Provisional application No. 62/727,224, filed on Sep. 5, 2018.

(51) Int. Cl.
| | |
|---|---|
| *H01R 13/66* | (2006.01) |
| *H01R 24/64* | (2011.01) |
| *H04W 4/80* | (2018.01) |
| *H01R 107/00* | (2006.01) |

(52) U.S. Cl.
CPC ..... *H01R 13/6691* (2013.01); *H01R 13/6625* (2013.01); *H01R 13/6633* (2013.01); *H01R 24/64* (2013.01); *H01R 2107/00* (2013.01); *H04W 4/80* (2018.02)

(58) Field of Classification Search
CPC ............ H01R 13/6691; H01R 13/6625; H01R 13/6633; H01R 24/64

USPC .......................................................... 439/135
See application file for complete search history.

(56) References Cited

U.S. PATENT DOCUMENTS

| | | | | |
|---|---|---|---|---|
| 7,597,259 B2* | 10/2009 | Nishikawa | ........... | G06K 7/0004 235/441 |
| 7,722,358 B2* | 5/2010 | Chatterjee | ........... | G06F 3/03543 439/38 |
| 8,217,893 B2* | 7/2012 | Quinn | .................... | G06F 3/0346 345/157 |
| 8,254,994 B2* | 8/2012 | Yang | .................... | H01Q 1/2275 455/347 |
| 8,670,803 B2* | 3/2014 | Schuh | .................. | H01Q 1/2275 455/562.1 |
| 8,795,022 B2* | 8/2014 | Lipman | .................... | A63H 3/28 446/175 |
| 8,880,909 B2* | 11/2014 | Tom | ........................ | G06F 1/266 370/278 |
| 8,907,634 B2* | 12/2014 | Arai | .......................... | H02J 7/04 320/111 |
| 8,912,911 B2* | 12/2014 | Krug | ....................... | H02J 7/342 340/636.1 |
| 9,203,254 B2* | 12/2015 | Balmefrezol | ......... | H02J 7/0068 |

(Continued)

*Primary Examiner* — Alexander Gilman
(74) *Attorney, Agent, or Firm* — Schwegman Lundberg & Woessner, P.A.

(57) ABSTRACT

At least one example embodiment is directed to a device including a first section having a connector that enables communication according to a first protocol. The device may further include a second section engageable with the first section. The second section may include a cavity that houses the connector when the second section is engaged with the first section, and an antenna that enables wireless communication according to a second protocol when the second section is engaged with the first section.

15 Claims, 10 Drawing Sheets

(56) References Cited

U.S. PATENT DOCUMENTS

| | | | |
|---|---|---|---|
| 9,342,163 B2* | 5/2016 | Lee | G06F 1/1656 |
| 9,923,376 B2* | 3/2018 | Davis | H04W 52/04 |
| 10,244,095 B2* | 3/2019 | Brenner | H04M 1/2745 |
| 10,362,463 B1* | 7/2019 | Gloss | H01Q 1/38 |
| 10,561,930 B2* | 2/2020 | Richards | G07F 17/3295 |
| 2005/0219208 A1* | 10/2005 | Eichenberger | G06F 3/03543 |
| | | | 345/157 |
| 2007/0008168 A1* | 1/2007 | Liao | G08C 17/02 |
| | | | 340/12.22 |
| 2008/0136737 A1* | 6/2008 | Fratti | H01Q 1/44 |
| | | | 343/895 |
| 2009/0006677 A1* | 1/2009 | Rofougaran | H01Q 1/2275 |
| | | | 710/63 |
| 2009/0179869 A1* | 7/2009 | Slotznick | G06F 3/0202 |
| | | | 345/173 |
| 2009/0313434 A1* | 12/2009 | Poo | G06F 13/1605 |
| | | | 711/115 |
| 2010/0124883 A1* | 5/2010 | Hu | H01Q 7/00 |
| | | | 455/39 |
| 2015/0193023 A1* | 7/2015 | Odgers | G06F 3/017 |
| | | | 345/163 |
| 2019/0065424 A1* | 2/2019 | Tani | H04L 69/18 |

* cited by examiner

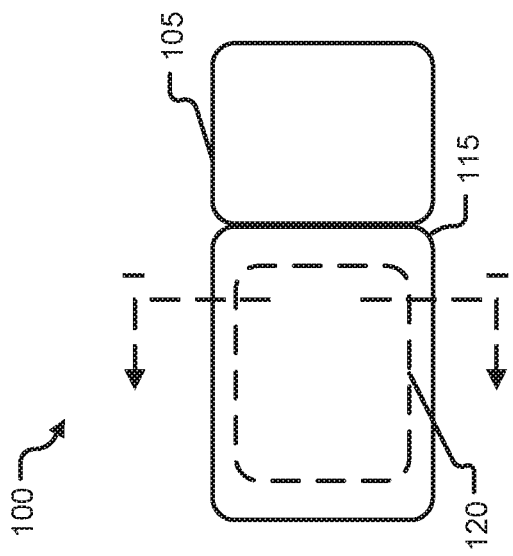
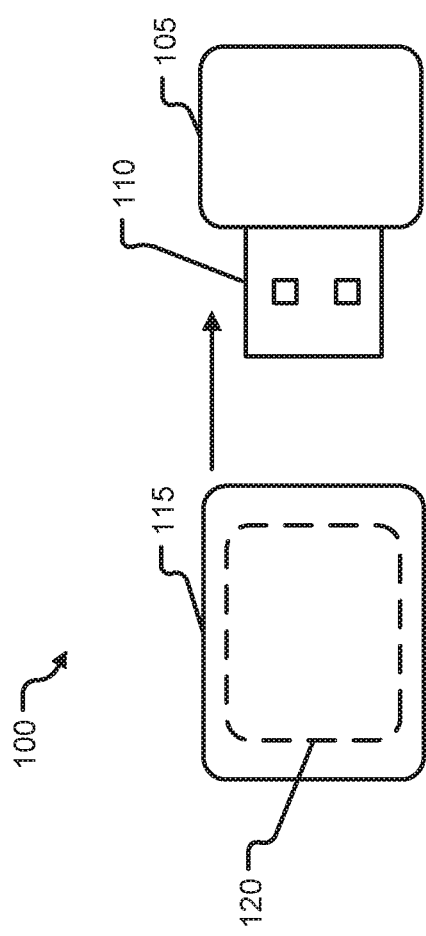
Fig. 1A
Fig. 1B

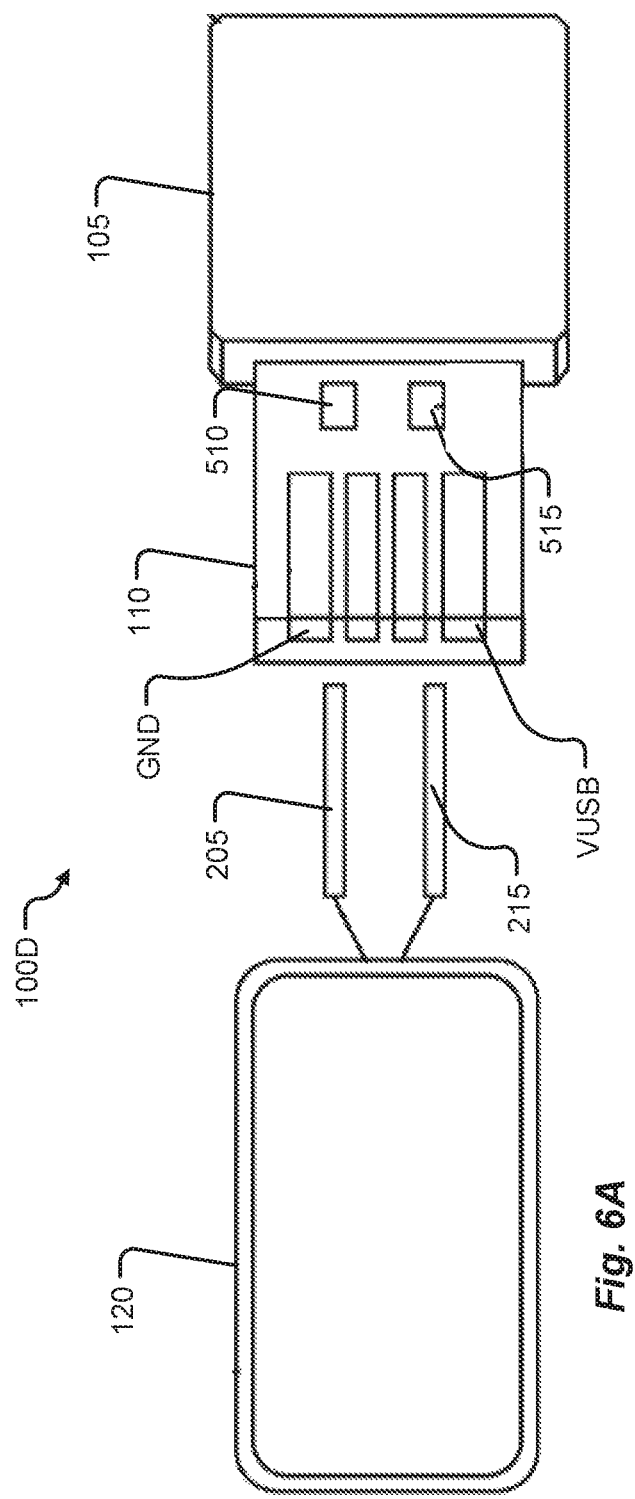
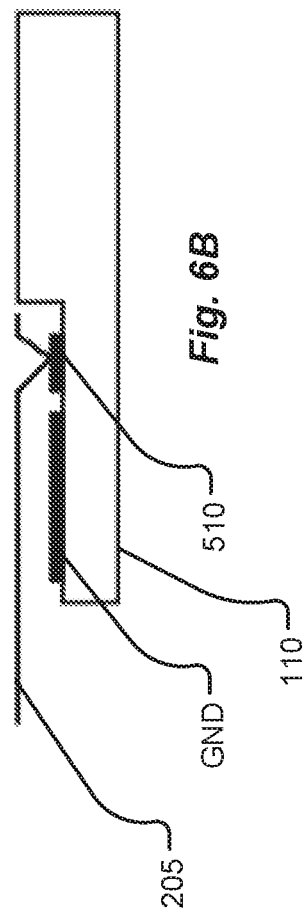
Fig. 6A
Fig. 6B

SYSTEMS AND DEVICES FOR AUTHENTICATION

CROSS-REFERENCE TO RELATED APPLICATIONS

This application claims priority to U.S. Provisional Pat. Appl. No. 62/727,224, titled "Systems and Devices for Authentication," filed Sep. 5, 2018, which is hereby incorporated by reference herein in its entirety.

FIELD OF THE DISCLOSURE

Example embodiments are directed to systems and devices for authentication.

BACKGROUND

Multi-factor authentication refers to a method of confirming a subject's alleged identity by having the subject present multiple instances of proof to an authenticating entity. These instances of proof may include knowledge specific to the subject (e.g., a password), possession (e.g., something the subject possesses, such as a key), and/or inherence (e.g., something inherently specific to the subject, such as a fingerprint or other biometric information). Instances of proof that utilize possession may employ some type of portable device containing a unique key or security token.

SUMMARY

At least one example embodiment is directed to a device that may include a first section having a connector that enables communication according to a first protocol. The illustrative device may further include a second section engageable with the first section. The second section may include a cavity that houses the connector when the second section is engaged with the first section, and an antenna that enables wireless communication according to a second protocol when the second section is engaged with the first section.

According to at least one example embodiment, the connector is a Universal Serial Bus (USB) connector.

According to at least one example embodiment, the first section further includes first control circuitry to control communication according to the first protocol and second control circuitry to control communication according to the second protocol.

According to at least one example embodiment, the first control circuitry and the second control circuitry perform authentication operations according to the first protocol and the second protocol, respectively.

According to at least one example embodiment, the first protocol, the connector, and the first control circuitry adhere to Universal Serial Bus (USB) standards. Alternatively or additionally, the second protocol, the antenna, and the second control circuitry adhere to one or more of Near-field Communication (NFC) standards.

According to at least one example embodiment, the second section may include a first terminal that electrically connects with a first pin of the connector and the second section may include a second terminal that electrically connects with a second pin of the connector.

According to at least one example embodiment, the first pin and the second pin are electrically connected with the second control circuitry and electrically isolated from the first control circuitry, a power supply pin of the connector, and a ground pin of the connector.

According to at least one example embodiment, the first pin is a power supply pin of the connector and the second pin is a ground pin of the connector.

According to at least one example embodiment, the first control circuitry and the second control circuitry are connected to the first and second pins in parallel with one another.

According to at least one example embodiment, the first section further may include a first coil positioned between the first pin and a power supply terminal of the first control circuitry, and a second coil positioned between the second pin and a ground terminal of the first control circuitry.

According to at least one example embodiment, the first section may further include a capacitance coupled between the first pin and the second pin and connected in parallel with the first control circuitry and the second control circuitry.

According to at least one example embodiment, inductances of the first coil and the second coil are at least ten times greater than an inductance of the antenna.

According to at least one example embodiment, the first section may further include a first capacitance coupled between the first pin and a power supply terminal of the second control circuitry, and a second capacitance coupled between the second pin and a ground terminal of the second control circuitry.

According to at least one example embodiment, the second section may include a plurality of walls that define the cavity, and the antenna is at least partially embedded in one or more of the plurality of walls.

At least one example embodiment is directed to a cap for a connector. The cap may include a first section engageable with a second section, the second section may include the connector. The first section may include an opening at one end that defines a cavity to house the connector when the first section is engaged with the second section, and an antenna at least partially embedded in the housing and that electrically connects with the connector to enable wireless communication according to a protocol when the first section is engaged with the second section.

According to at least one example embodiment, the connector enables communication according to another protocol.

According to at least one example embodiment, the first section includes a switch that enables or disables the antenna.

According to at least one example embodiment, the antenna and the protocol adhere to Near-field Communication (NFC) standards, and the connector and the another protocol adhere to Universal Serial Bus (USB) standards.

According to at least one example embodiment, the first section may include a first terminal electrically connected to a first end of the antenna, and the first section may include a second terminal electrically connected to a second end of the antenna.

According to at least one example embodiment, the first terminal and the second terminal are positioned on the housing such that when the first section is engaged with the second section, the first terminal makes electrical contact with a power supply pin of the connector and the second terminal makes electrical contact with a ground pin of the connector.

According to at least one example embodiment, the first terminal comprises a first prong that extends into an interior of the housing to make electrical contact with the power supply pin, and the second terminal comprises a second prong that extends into the interior of the housing to make electrical contact with the ground pin.

At least one example embodiment is directed to a Universal Serial Bus (USB) device that includes a first section that may include a USB connector that enables communication according to USB standards, and a second section engageable with the first section. The second section may include a cavity that houses the connector when the second section is engaged with the first section, and an antenna that enables wireless communication when the second section is engaged with the first section.

Various aspects of the example embodiments will be described herein with reference to drawings that are schematic illustrations of idealized configurations. It should be appreciated that while particular circuit configurations and circuit elements are described herein, example embodiments are not limited to the illustrative circuit configurations and/or circuit elements depicted and described herein. Specifically, it should be appreciated that circuit elements of a particular type or function may be replaced with one or multiple other circuit elements to achieve a similar function without departing from the scope of example embodiments.

BRIEF DESCRIPTION OF THE DRAWINGS

The present disclosure is described in conjunction with the appended figures, which are not necessarily drawn to scale. It should be understood, of course, that the invention is not necessarily limited to the particular embodiments illustrated herein.

FIG. 1A illustrates an unengaged view of a device according to at least one example embodiment;

FIG. 1B illustrates an engaged view of the device in FIG. 1A according to at least one example embodiment;

FIG. 6A illustrates an example schematic of a device according to at least one example embodiment;

FIG. 6B illustrates a side view of the device in FIG. 6A according to at least one example embodiment;

DETAILED DESCRIPTION

Figure 2:
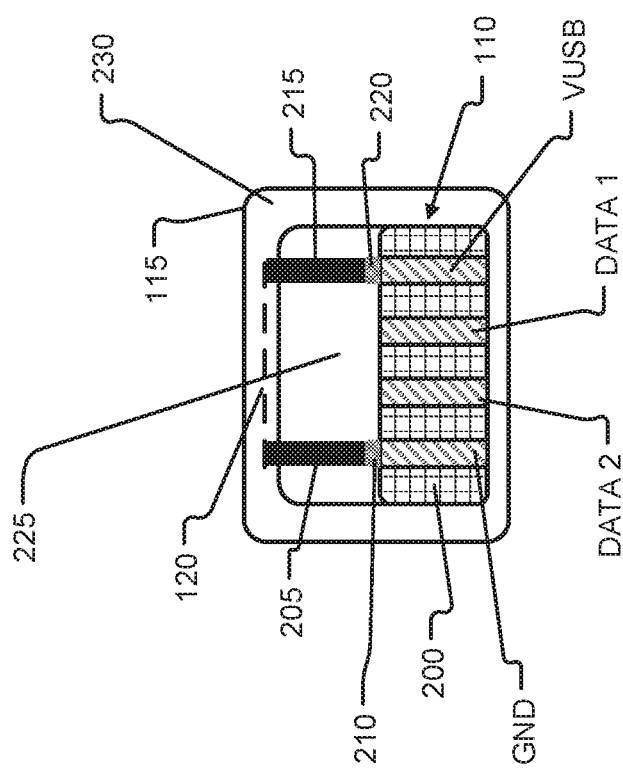
FIG. 2 illustrates a cross sectional view taken along line I-I in FIG. 1B according to at least one example embodiment.

FIGS. 1A and 1B illustrate views of a device (or authentication device) 100 according to at least one example embodiment. As shown, the device 100 includes a first section 105 having a connector 110 that enables communication according to a first protocol. According to at least one example embodiment, the connector 110 is or includes a Universal Serial Bus (USB) connector. For example, the USB connector may be USB A-type, USB B-type, USB C-type, Micro-USB A, Micro-USB B, USB mini-b (four pin or five pin), USB 3.0 A-type, USB 3.0 B-type, USB 3.0 Micro B, etc. However, example embodiments are not limited to USB connectors, and the connector 110 may be any connector for enabling serial or parallel data communications between two devices. According to at least one example embodiment, the first protocol is or includes a Universal Serial Bus standard (e.g., USB 1.x, USB 2.x, USB 3.x), Thunderbolt standard, etc. However, example embodiments are not limited to USB or Thunderbolt standards, and the first protocol may be any serial or parallel communications protocol. It should be further understood that enabling connections to various external devices can be accomplished with one or more adapters.

The device 100 is further shown to include a second section 115 engageable with the first section 105. The first and second sections 105/115 may mechanically engage via a snap-fit connection, a snug-fit connection, a friction-fit connection, or other suitable type of mechanical connection. FIG. 1A illustrates a case where the first section 105 is not engaged with the second section 115, and FIG. 1B illustrates a case where the first section 105 is engaged with the second section 115. The second section 115 includes a housing with an opening at one end to define a cavity (see cavity 225 in FIG. 2) that houses the connector 110 when the second section 115 is engaged with the first section 105. In this manner, the second section 115 may act as a removable cap or cover for the connector 110. The second section 115 may further include an antenna 120 that enables wireless communication according to a second protocol when the second section 115 is engaged with the first section 105. According to at least one example embodiment, the second protocol is or includes a Near-Field Communication (NFC) standard. However, example embodiments are not limited to NFC standards, and the second protocol may be any short range wireless protocol. Here, it should be understood that the antenna 120 may include any type of antenna used for wireless transmission and/or reception of signals, such as a loop antenna, a patch antenna, an RFID antenna, a slot antenna, or any other suitable type of antenna. The antenna 120 is formed to have a desired resonant frequency, which may vary according to design preferences.

Elements of the first section 105 and the second section 115 will be described in more detail below with reference to FIGS. 2-5.

FIG. 2 illustrates a cross sectional view taken along line I-I in FIG. 1 according to at least one example embodiment. That is, FIG. 2 illustrates elements of the first section 105 and the second section 115 when engaged.

With reference to FIGS. 1A, 1B, and 2, the connector 110 includes an insulative substrate 200 (e.g., plastic) with one or more pins or contacts disposed in the substrate 200. FIG. 2 depicts an example where the connector 110 is a USB A-type connector that includes a ground pin GND, a power supply pin VUSB, and data pins DATA 1 and DATA 2.

The second section 115 illustratively includes a housing 230 with an opening at one end of the housing 230 to define a cavity 225. In some embodiments, the cavity 225 is configured to house the connector 110 when the second section 115 is engaged with the first section 105. The second section 115 may further include a first terminal 205 that electrically connects with a first pin (e.g., GND) of the connector 110. The second section 115 may further include a second terminal 215 that electrically connects with a second pin (e.g., VUSB) of the connector 110. The first and second terminals 205/215 may include a conductive material, such as a metal (e.g., copper).

As shown, the first terminal 205 and the second terminal 215 are positioned on the housing 230 such that when the first section 105 is engaged with the second section 115, the second terminal 215 makes electrical contact with a power supply pin VUSB of the connector 110 and the first terminal 205 makes electrical contact with a ground pin GND of the connector 110. For example, the first terminal 205 may include a first prong that extends into the interior of the housing 230 to make electrical contact with the ground pin GND, and the second terminal 215 may include a second prong that extends into an interior of the housing 230 to make electrical contact with the power supply pin VUSB. According to at least one example embodiment, the first and second terminals 205 and 215 are embodied with leaf springs that have both ends (or one end) fixed to an inner surface of the second section 115. Each leaf spring may include a middle portion that flexes (e.g., compresses) upon engagement of the first and second sections 105/115 to create electrical contact with the pins GND and VUSB.

According to at least one example embodiment, the first and second terminals 205 and 215 include respective conductive pads 210 and 220 for making contact with respective pins GND and VUSB. Further, the first terminal 205 may be electrically coupled to one end of the antenna 120 while the second terminal 215 may be electrically coupled to another end of the antenna 120. When the first and second sections 105 and 115 are not engaged, the ends of the antenna 120 are electrically isolated from one another.

The first section 105 and the second section 115 may include a polymer, such as plastic or other material suitable for encasing elements of the first section 105 and the second section 115. The second section 115 may include a plurality of walls that define the cavity 225, and the antenna 120 is at least partially embedded in one or more of the plurality of walls. FIG. 2 shows an example where the antenna 120 is embedded in one wall of the second section 115. However, example embodiments are not limited thereto, and the antenna 120 may be embedded into other walls of the second section 115, disposed on an inner surface and/or an outer surface of one or more of the walls of the second section 115, etc. In other words, the location and type of antenna 120 may vary according to design preferences.

Figure 3:
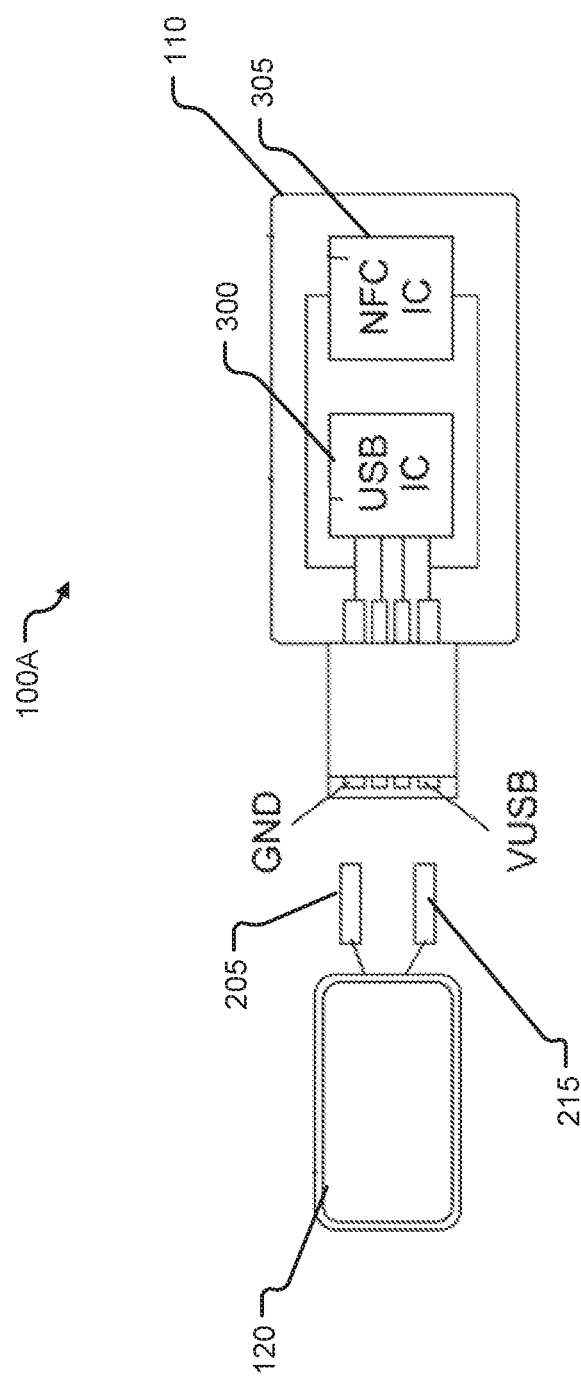
FIG. 3 illustrates an example schematic of a device according to at least one example embodiment.

FIG. 3 illustrates an example schematic of a device according to at least one example embodiment.

With reference to FIGS. 1A-3, device 100A may include the antenna 120 having ends respectively connected to terminals 205 and 215. The first section 110 includes first control circuitry 300 to control communication according to the first protocol, and second control circuitry 305 to control communication according to the second protocol. FIG. 3 illustrates an example where the first control circuitry 300 is a USB integrated circuit (IC) and the second control circuitry 305 is an NFC IC. Thus, the first protocol, the connector 110, and the first control circuitry 300 adhere to Universal Serial Bus (USB) standards, and the second protocol, the antenna 120, and the second control circuitry 305 adhere to Near-field Communication (NFC) standards. However, example embodiments are not limited thereto, and the USB IC 300 and the NFC IC 305 may be replaced by or supplemented with other circuitry for communication, such as circuitry for secure digital (SD) technology, circuitry for Bluetooth technology, circuitry for high definition (HD) technology, circuitry for Wi-Fi technology, etc.

Here, it should be understood that the first and second control circuitry 300/305 may include hardware and/or software for controlling operations of the device and communication with external devices. For example, the control circuitry 300/305 may include an integrated circuit (IC) (e.g., an application specific IC (ASIC)), a microprocessor executing instructions on a computer readable medium, and/or other elements capable of processing incoming and outgoing signals.

According to at least one example embodiment, the first control circuitry 300 and the second control circuitry 305 perform authentication operations according to the first protocol and the second protocol, respectively. These authentication operations include any operations for performing multi-factor authentication, and occur according to an associated protocol/standard for authentication. For example, the authentication operations may adhere to protocols/standards for communication using Fast Identity Online Universal Second Factor (FIDO U2F), FIDO 2.0 (Client to Authenticator Protocol (CTAP)), the initiative for open authentication (OATH), public key infrastructure (PKI), personal identity verification (PIV), open protocol for access control, identification, and ticketing with privacy (OPACITY), etc. Thus, the first control circuitry 300 and the second control circuitry 305 may include one or more security tokens or keys stored thereon for enabling the authentication. The first control circuitry 300 and the second control circuitry 305 may also perform data transfer functions in addition to authentication functions if desired.

As shown in FIG. 3, the first control circuitry 300 and the second control circuitry 305 are connected to the first and second pins GND/VUSB so as to be in parallel with one another. That is, the first control circuitry 300 and the second control circuitry 305 share a same power supply connection (VUSB) and ground connection (GND).

Figure 4:
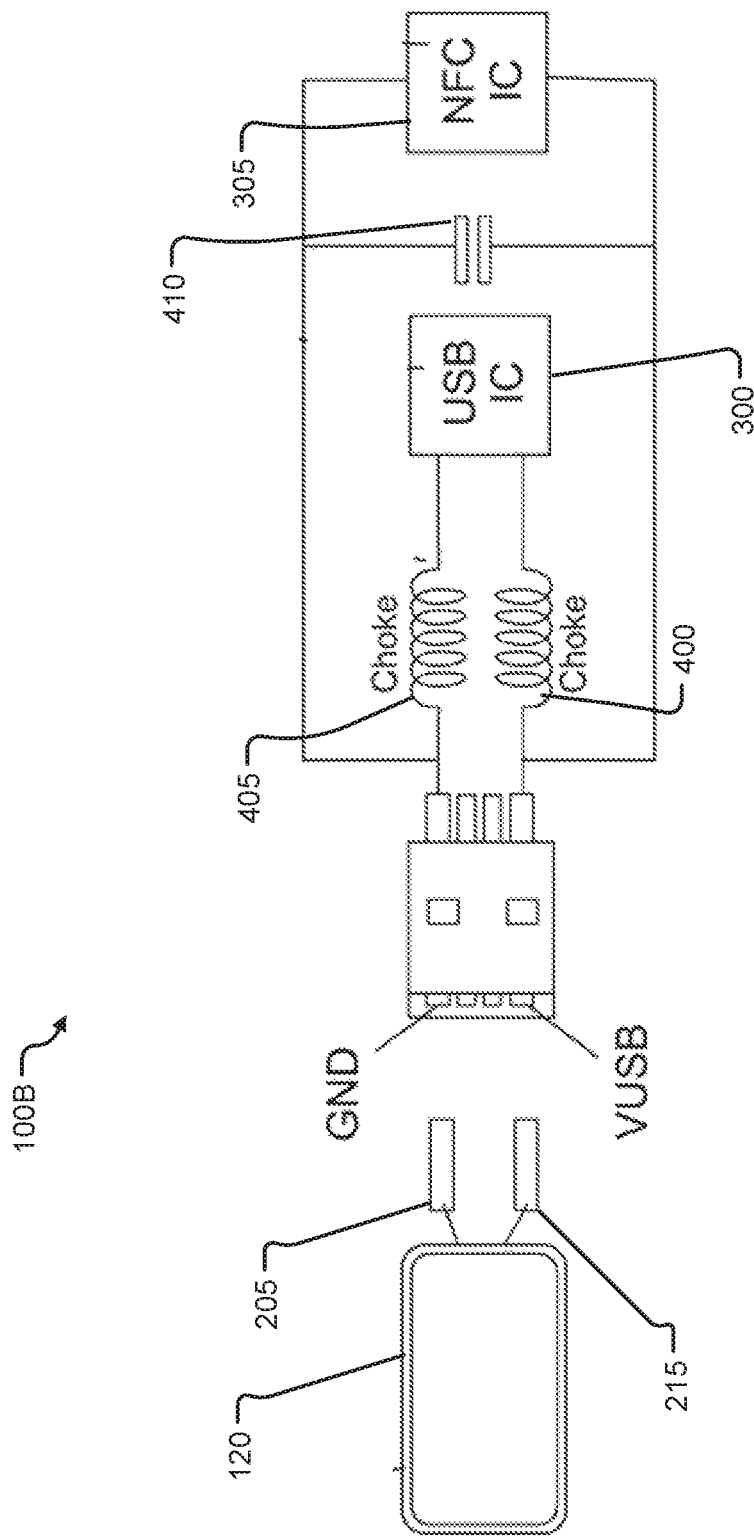
FIG. 4 illustrates an example schematic of a device according to at least one example embodiment.

FIG. 4 illustrates an example schematic of a device according to at least one example embodiment. With reference to FIGS. 1A-4, device 100B in FIG. 4 includes the same elements as the device 100A in FIG. 3 except that the first section 105 may further include a first coil (inductor) 400, a second coil (inductor) 405, and a capacitance 410. As shown, the first coil 400 is positioned between the first pin (VUSB) and a power supply terminal of the first control circuitry 300. The second coil 405 is positioned between the second pin (GND) and a ground terminal of the first control circuitry 300. The first and second coils 400/405 act as radio frequency (RF) choke coils to prevent (or mitigate) high frequency signals (e.g., at 125 KHz, 13.56 MHz, 300 MHz, 3 GHz, etc.) between the antenna 120 and the second control circuitry 305 from reaching the first control circuitry 300. Said another way, a low pass filter is inserted into the first control circuitry 300 so that when the first section 105 and the second section 115 are engaged, signals between the antenna 120 and the second control circuitry 305 are not interfered with by the first control circuitry 300. According to at least one example embodiment, inductances of the first coil 400 and the second coil 405 are at least ten times greater than an inductance of the antenna 120. However, example embodiments are not limited thereto, and the inductances of the coils 400/405 may vary according to design preferences.

As shown in FIG. 4, the first section 105 may further include a capacitance 410 coupled between the first pin and the second pin (i.e., between VUSB and GND) and connected in parallel with the first control circuitry 300 and the second control circuitry 305. Here, the capacitance 410 may have a desired value that completes an LC circuit formed by the antenna 120 and the capacitance 410.

Figure 5:
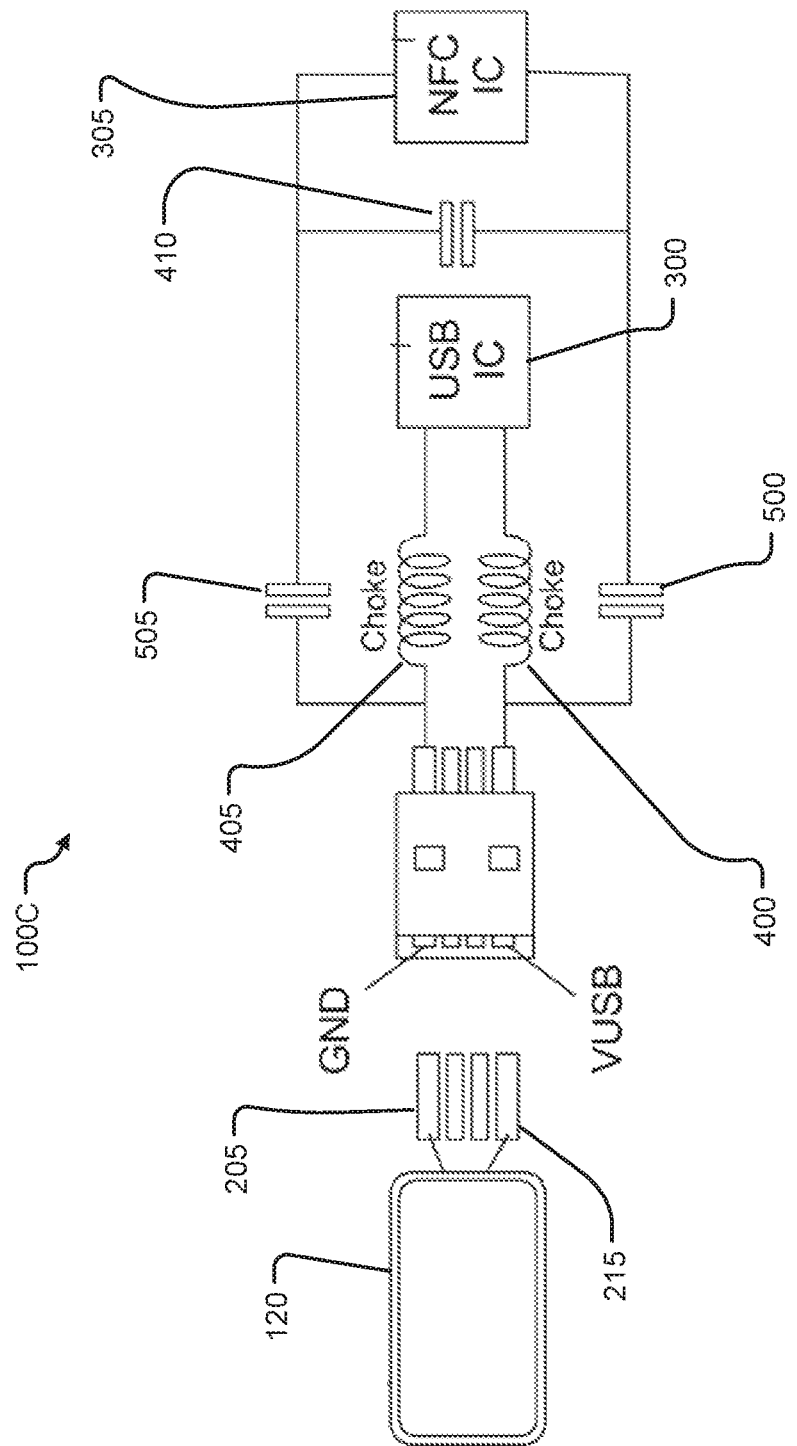
FIG. 5 illustrates an example schematic of a device according to at least one example embodiment.

FIG. 5 illustrates an example schematic of a device according to at least one example embodiment. With reference to FIGS. 1A-5, the device 100C includes the same elements as those shown in FIG. 4 except for the addition of a first capacitance 500 coupled between the first pin VUSB and a power supply terminal of the second control circuitry 305, and a second capacitance 505 coupled between the second pin GND and a ground terminal of the second control circuitry 305. When the first section 105 and the second section 115 are engaged, first and second capacitances 500/505 prevent or reduce direct current (DC) flow to the terminals of the second control circuitry 305, thereby protecting the second control circuitry 305. In addition, the capacitances 500/505 may eliminate or reduce direct current flow when the first section 105 is plugged into an appropriate port (e.g., USB port) to perform operations of only the first control circuitry 300.

FIG. 6A illustrates an example schematic of a device 100D according to at least one example embodiment. As shown in FIG. 6A, the connector 110 of the first section 105 may include contact pads 510 and 515 for making contact with the terminals 205/215 of the second section 115. According to at least one example embodiment, the contact pads 510 and 515 are positioned between the VUSB, GND, and DATA1/DATA2 pads of the connector 110 and a body or housing of the first section 105. However, example embodiments are not limited thereto and the contact pads 510/515 may be positioned at any desired location on the connector 110.

FIG. 6B illustrates a side view of the device 100D when the first section 105 and the second section 115 are engaged. As shown in FIG. 6B, the terminal 205 included in the second section 115 has a structure that makes electrical contact with the contact pad 510 while avoiding electrical contact with the other pads of the connector 110. Similarly, the terminal 215 has a structure that makes electrical contact with contact pad 515 while avoiding electrical contact with the other pads of the connector 110.

Here, it should be understood that first section 105 includes wiring that wires the contact pads 510/515 to respective input/output terminals of the second control circuitry 305. The wiring remains electrically isolated from the VUSB, GND, DATA1, and DATA2 pads of the connector 110 as well as the first control circuitry 300. Thus, the device 100D may avoid the use of the coils 400/405 and capacitors 500/505 shown in FIGS. 4 and 5 because the antenna 120 and the second control circuitry 305 are electrically isolated from the first control circuitry 300 and the remaining pads of the connector 110.

Figure 7:
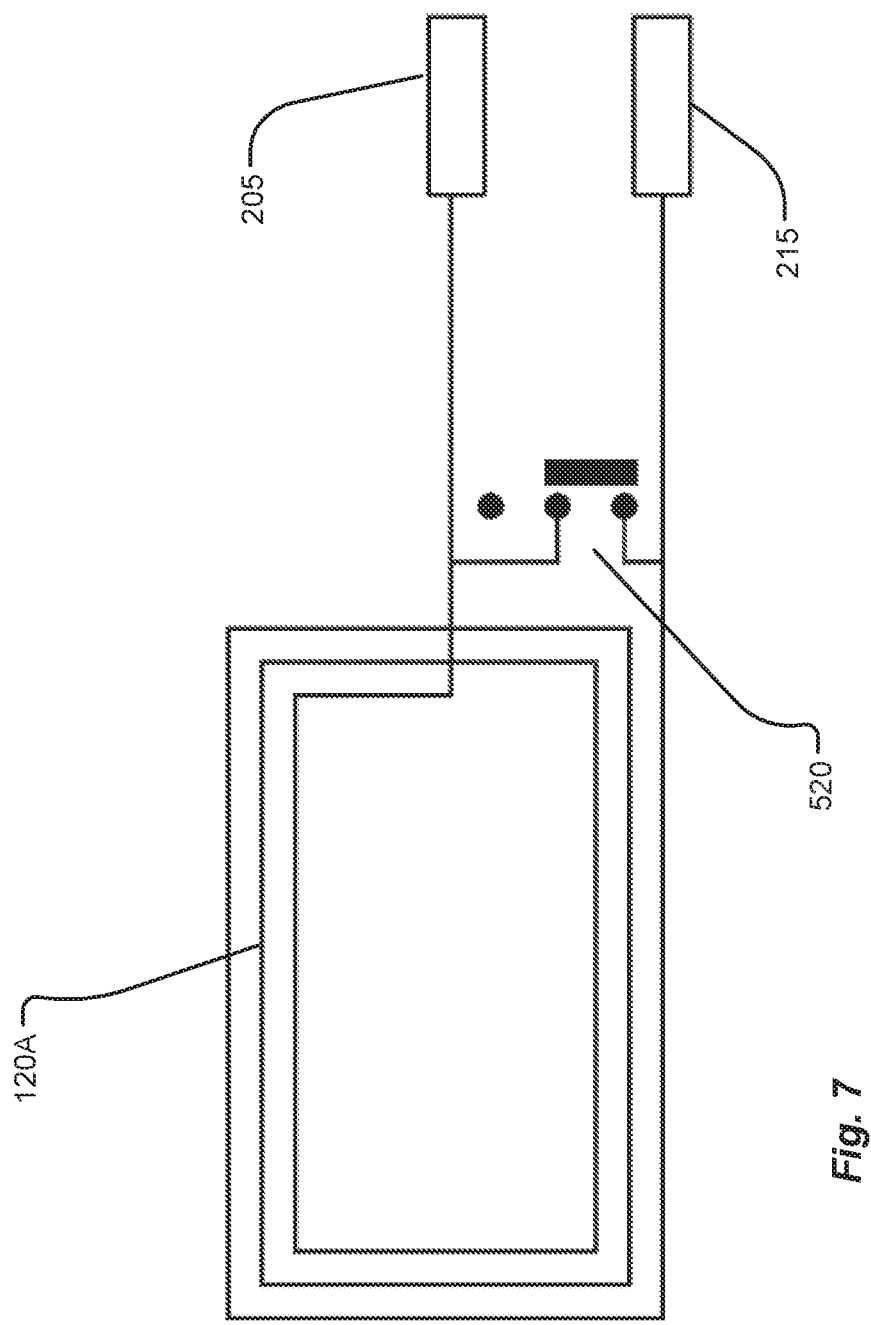
FIG. 7 illustrates an example schematic of an antenna according to at least one example embodiment.

FIG. 7 illustrates an example schematic of an antenna 120A according to at least one example embodiment. As shown in FIG. 7, the second section 115 may include the antenna 120A and a switch 520. The switch 520 may be switchable between two positions in order to enable or disable the antenna 120A. Here, the switch 520 is coupled in parallel with the antenna loop to enable selective cancellation of the resonance function of antenna 120A. For example, when it is desired to turn OFF the resonance function, the switch 520 is switched to a first position shown in FIG. 7 in order to short circuit two ends of the antenna 120A. When it is desired to turn ON the resonance function, the switch 520 is switched to a second position (not explicitly shown) to remove the short circuit of the two ends of the antenna 120A, thereby enabling the resonance function of the antenna 120A. The second section 115 may include any hardware desired for enabling a user of the device 100 to toggle the switch 520 (e.g., a button, a throw switch, or other mechanical device that allows switching between two states).

Figure 8:
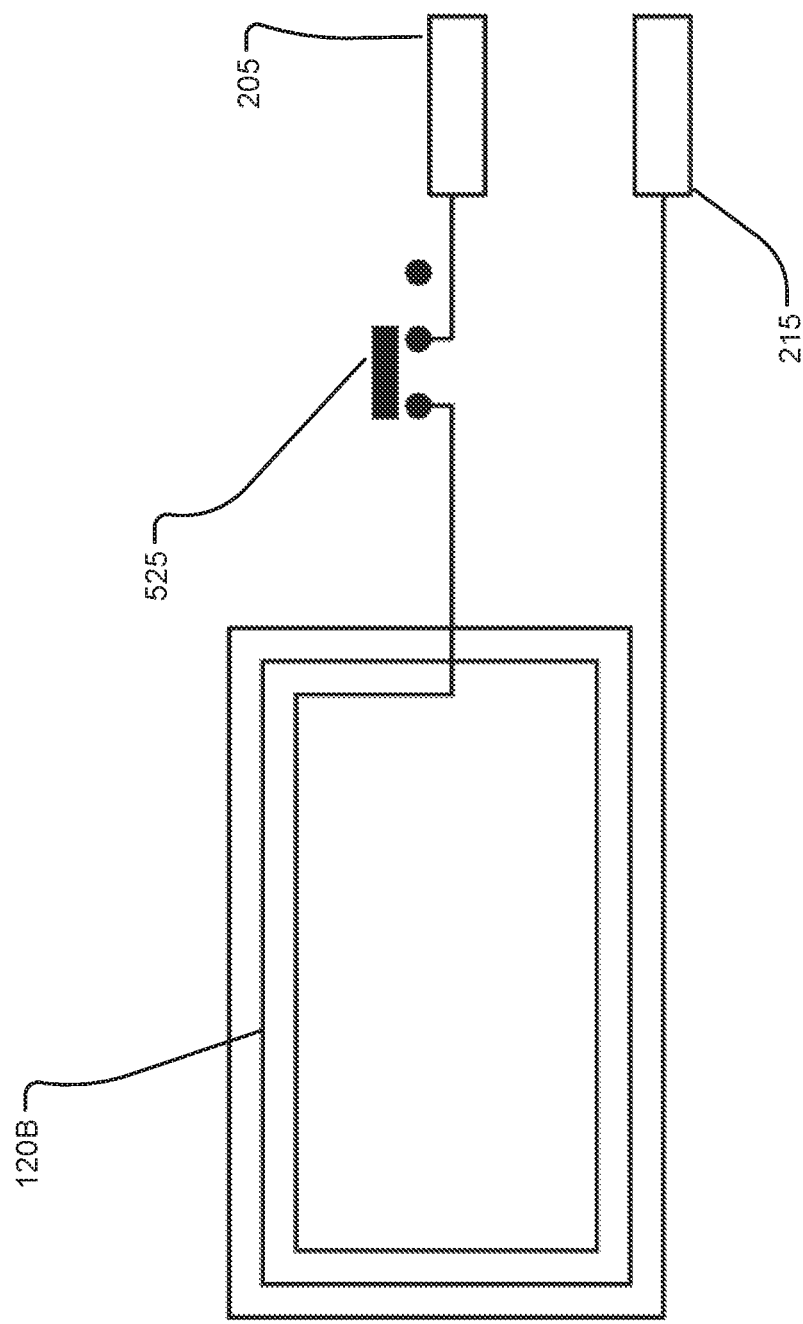
FIG. 8 illustrates an example schematic of an antenna according to at least one example embodiment.

FIG. 8 illustrates an example schematic of an antenna 120B according to at least one example embodiment. As shown in FIG. 8, the second section 115 may include the antenna 120B and a switch 525. The switch 525 may be switchable between two positions in order to enable or disable the antenna 120B. Here, the switch 525 is coupled in series with one or both of the ends of the antenna 120B to enable selective cancellation of the resonance function of antenna 120B. FIG. 8 illustrates an example where the switch 525 is coupled in series with the end of the antenna 120B that couples to terminal 205. However, the switch 525 may alternatively be coupled in series with the end of the antenna 120B that couples to terminal 215. In at least one example embodiment, two switches 525 may be included if desired. When it is desired to turn ON the resonance function, the switch 525 is switched to a first position shown in FIG. 8 in order to connect one end of the antenna 120B to the terminal 205. When it is desired to turn OFF the resonance function, the switch 525 is switched to a second position (not explicitly shown) to disconnect the end of the antenna 120B with the terminal 205, thereby disabling the resonance function of antenna 120B. The second section 115 may include any hardware desired for enabling a user of the device 100 to toggle the switch 520 (e.g., a button, a throw switch, or other mechanical device that allows switching between two states).

In view of FIGS. 7 and 8, it should be understood that including the aforementioned switches 520 and/or 525 allow for a user of the device 100 to prevent or mitigate sniffing attacks when the first section 105 and the second section 115 are engaged by disabling the function of the antenna if desired.

Figure 9:
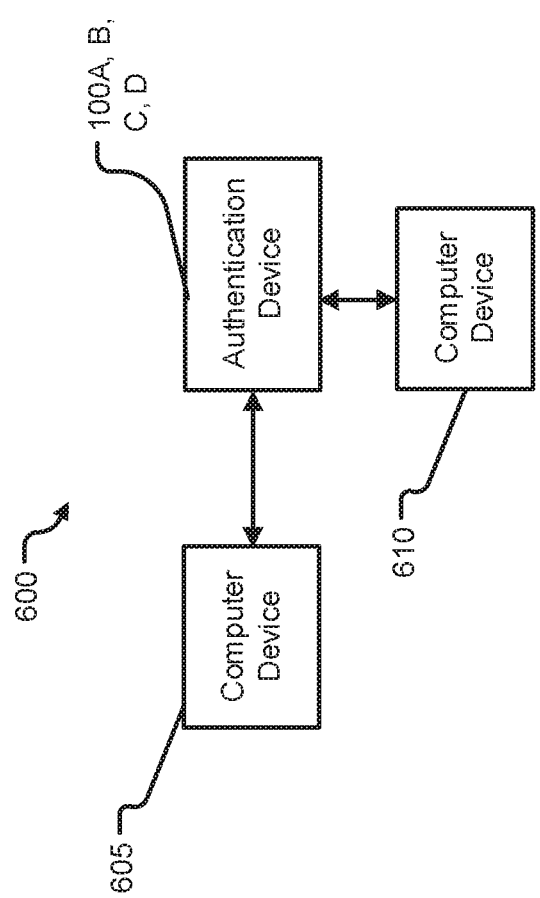
FIG. 9 illustrates a system including a device according to at least one example embodiment.

FIG. 9 illustrates a system 600 including a device of FIGS. 1A-8 according to at least one example embodiment. In more detail, the system 600 includes computer devices 605 and 610. The computer device 605 may be a device that includes an interface that accepts the connector 110 and that communicates with the first control circuitry 300. For example, the computer device 605 may be a personal computer with a USB port for accepting the connector 110. When the first section 105 and the second section 115 are not engaged, the first section 105 may be used for authenticating a user to the computer device 605.

The computer device 610 may be a device having an interface that communicates with the antenna 120 and the second control circuitry 305. For example, the computer device 610 may be a smart phone with an NFC interface. When the first section 105 and the second section 115 are engaged, then the second control circuitry 305 may be used for authenticating a user to the computer device 610.

Figure 10:
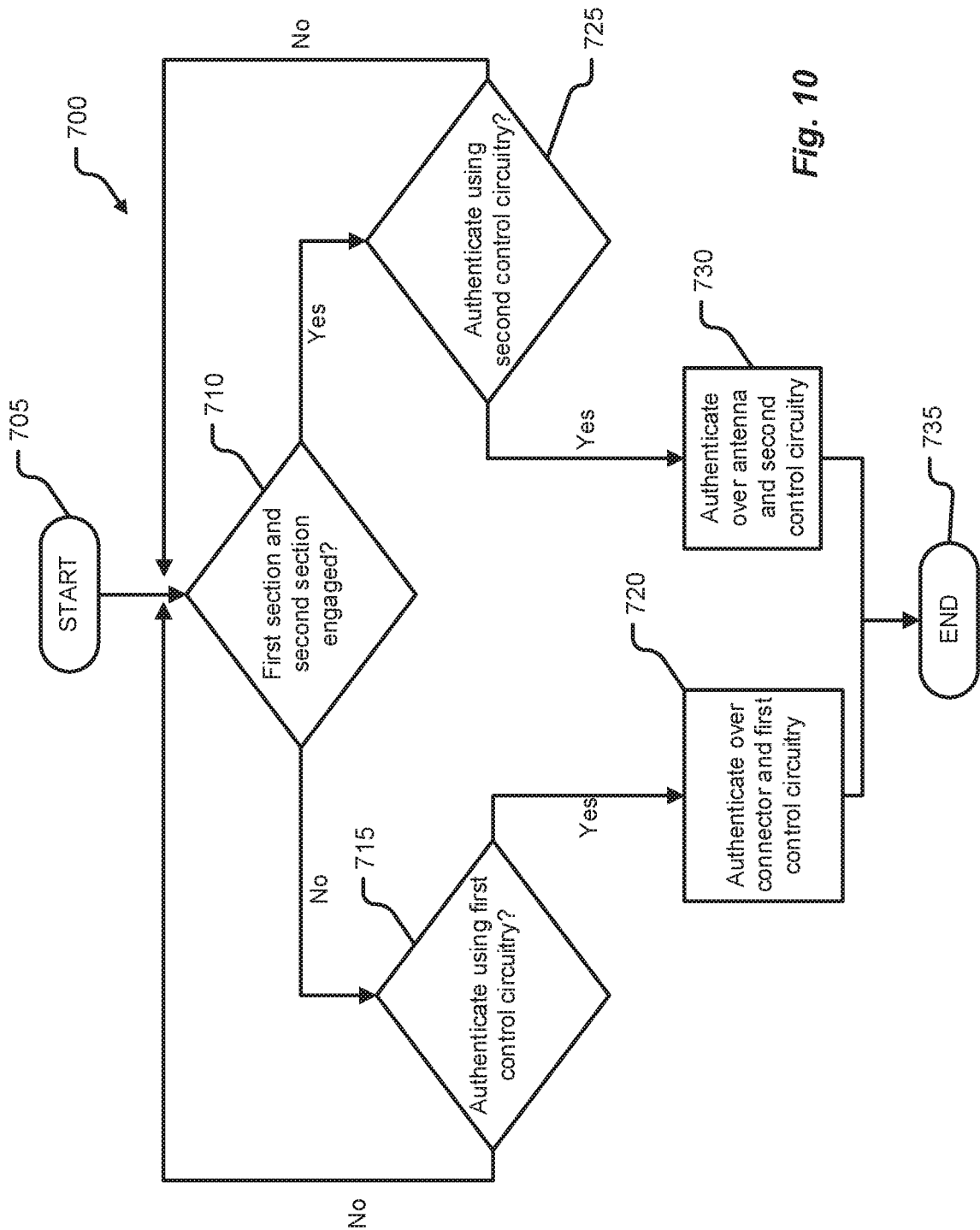
FIG. 10 illustrates a method according to at least one example embodiment.

FIG. 10 illustrates a method 700 according to at least one example embodiment. As shown in FIG. 10, the method 700 starts at operation 705 and ends at operation 735. It should be understood that the method 700 may include additional operations not illustrated. Further, the operations of the method 700 may be performed in a different order than that shown if desired. The method 700 may be carried out by one or more of the above described elements from FIGS. 1A-9. Accordingly, FIG. 10 will be discussed with reference to FIGS. 1A-9.

In operation 710, the method 700 determines whether the first section 105 and the second section 115 are engaged. The determination in operation 710 may be a manual determination. Additionally or alternatively, the first section 105 includes circuitry to identify when the second section 115 is engaged (e.g., the first section 105 includes components that indicate an open circuit or closed circuit between the antenna 120 and the second control circuitry 305, where the open circuit occurs when the sections are not engaged and the closed circuit occurs when the sections are engaged).

If the method 700 determines that the first and section sections 105/115 are not engaged, the method 700 proceeds to operation 715 and determines whether to perform authentication operations using the first control circuitry 300. The determination in operation 715 may be based on whether the first control circuitry 300 has received an authentication request from a requesting device (e.g., computer device 605). If an authentication request has been received, the method 700 proceeds to operation 720 and performs authentication operations over the connector 110. If no request has been received, then the method 700 returns to operation 710.

If, in operation 710, the method 700 determines that the first and second sections 105/115 are engaged, the method 700 proceeds to operation 725 and determines whether to perform authentication operations using the second control circuitry 305. For example, the determination in operation 725 may be based on whether the second control circuitry 300 has received an authentication request from a requesting device (e.g., computer device 610). If an authentication request has been received, the method proceeds to operation 730 and performs authentication operations over the antenna 120 and second control circuitry 305. If no request has been received, the method 700 returns to operation 710.

In view of the foregoing description, it should be appreciated that example embodiments provide for systems and devices that allow authentication (e.g., multi-factor authentication) using both wired and wireless authentication protocols in a single package. Example embodiments also provide a compact device in that the antenna used for wireless communication is built into a cap or cover that protects the connector used for wired communication. Thus, the section containing the connector may have a reduced footprint, which may further reduce the footprint of the entire device.

Throughout the foregoing description, it should be understood that references to various elements as being "first," "second," etc. are not limiting. That is, the terms "first," "second," etc. are used for convenience of explanation and may in some cases be interchangeable. For example, an element described as "first" may be later referred to as "second" or vice versa without limiting example embodiments.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A device, comprising:
    a first section comprising:
        a connector that enables communication according to a first protocol, the connector comprising a first pin and a second pin;
        first control circuitry to control communication according to the first protocol; and
        second control circuitry to control communication according to a second protocol;
        wherein the first pin and the second pin are electrically connected with the second control circuitry, and wherein the first pin and the second pin are electrically isolated from the first control circuitry, a power supply pin of the connector, and a ground pin of the connector; and
    a second section engageable with the first section, the second section comprising:
        a cavity that houses the connector when the second section is engaged with the first section;
        a first terminal that electrically connects with the first pin of the connector;
        a second terminal that electrically connects with the second pin of the connector; and
        an antenna that enables wireless communication according to the second protocol when the second section is engaged with the first section.

2. The device of claim 1, wherein the connector is a Universal Serial Bus (USB) connector.

3. The device of claim 1, wherein the first control circuitry and the second control circuitry perform authentication operations according to the first protocol and the second protocol, respectively.

4. The device of claim 1, wherein the first protocol, the connector, and the first control circuitry adhere to Universal Serial Bus (USB) standards, and wherein the second protocol, the antenna, and the second control circuitry adhere to Near-field Communication (NFC) standards.

5. The device of claim 1, wherein the second section comprises a plurality of walls that define the cavity, and wherein the antenna is at least partially embedded in one or more of the plurality of walls.

6. A cap for a connector, the cap comprising:
    a first section engageable with a second section, the second section comprising the connector, the first section comprising:
        a housing comprising an opening at one end of the housing to define a cavity that houses the connector when the first section is engaged with the second section;
        an antenna at least partially embedded in the housing; and that electrically connects with the connector to enable wireless communication according to a protocol when the first section is engaged with the second section;
        a first terminal electrically connected to a first end of the antenna and comprising a first prong that extends into the cavity of the housing; and
        a second terminal electrically connected to a second end of the antenna and comprising a second prong that extends into the cavity of the housing wherein, the first prong and the second prong are positioned on the housing such that when the first section is engaged with the second section, the first prong makes electrical contact with a power supply pin of the connector and the second prong makes electrical contact with a ground pin of the connector; and
    wherein each of the first and second prongs comprises a leaf spring having a middle portion that flexes upon engagement of the first and second sections.

7. The cap of claim 6, wherein the connector enables communication according to another protocol, and wherein the first section includes a switch that enables and disables the antenna.

8. A device, comprising:
a first section comprising:
- a connector that enables communication according to a first protocol, the connector comprising a power supply pin and a ground pin;
- first control circuitry to control communication according to the first protocol;
- second control circuitry to control communication according to a second protocol;
- a first coil positioned between the power supply pin and a power supply terminal of the first control circuitry;
- a second coil positioned between the ground pin and a ground terminal of the first control circuitry; and
- a capacitance coupled between the power supply pin and the ground pin and connected in parallel with the first control circuitry and the second control circuitry; and a second section engageable with the first section, the second section comprising:
- a cavity that houses the connector when the second section is engaged with the first section;
- a first terminal that electrically connects with the power supply pin of the connector;
- a second terminal that electrically connects with the ground pin of the connector; and
- an antenna that enables wireless communication according to the second protocol when the second section is engaged with the first section.

9. The device of claim 8, wherein the connector is a Universal Serial Bus (USB) connector.

10. The device of claim 8, wherein the first control circuitry and the second control circuitry perform authentication operations according to the first protocol and the second protocol, respectively.

11. The device of claim 8, wherein the first protocol, the connector, and the first control circuitry adhere to Universal Serial Bus (USB) standards, and wherein the second protocol, the antenna, and the second control circuitry adhere to Near-field Communication (NFC) standards.

12. The device of claim 8, wherein the second section comprises a plurality of walls that define the cavity, and wherein the antenna is at least partially embedded in one or more of the plurality of walls.

13. The device of claim 8, wherein the first control circuitry and the second control circuitry are connected to the power supply pin and the ground pin in parallel with one another.

14. The device of claim 8, wherein inductances of the first coil and the second coil are at least ten times greater than an inductance of the antenna.

15. The device of claim 8, wherein the first section further comprises:
- a first capacitance coupled between the power supply pin and a power supply terminal of the second control circuitry; and
- a second capacitance coupled between the ground pin and a ground terminal of the second control circuitry.

* * * * *